United States Patent
Yukishima et al.

(10) Patent No.: US 11,662,010 B2
(45) Date of Patent: May 30, 2023

(54) VEHICLE DRIVE DEVICE

(71) Applicant: NTN Corporation, Osaka (JP)

(72) Inventors: Ryou Yukishima, Shizuoka (JP); Tetsuya Yamamoto, Shizuoka (JP); Katsunori Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 8 days.

(21) Appl. No.: 17/262,848

(22) PCT Filed: Aug. 9, 2019

(86) PCT No.: PCT/JP2019/031607
§ 371 (c)(1),
(2) Date: Jan. 25, 2021

(87) PCT Pub. No.: WO2020/036138
PCT Pub. Date: Feb. 20, 2020

(65) Prior Publication Data
US 2021/0190192 A1 Jun. 24, 2021

(30) Foreign Application Priority Data

Aug. 17, 2018 (JP) .............................. JP2018-153548

(51) Int. Cl.
*F16H 55/08* (2006.01)
*F16H 55/17* (2006.01)
*F16H 1/08* (2006.01)

(52) U.S. Cl.
CPC ......... *F16H 55/0806* (2013.01); *F16H 55/17* (2013.01); *F16H 1/08* (2013.01); *F16H 2055/0893* (2013.01)

(58) Field of Classification Search
CPC ........ F16H 55/0806; F16H 55/17; F16H 1/08; F16H 2055/0893
See application file for complete search history.

(56) References Cited

U.S. PATENT DOCUMENTS 2,403,492 A    7/1946   Boor
8,225,690 B2 * 7/2012   Shimada ............. F16H 57/0006
                                                         74/462

(Continued)

FOREIGN PATENT DOCUMENTS

CN       101121393      2/2008
JP       2001-248694    9/2001

(Continued)

OTHER PUBLICATIONS

International Search Report dated Sep. 17, 2019 in International (PCT) Application No. PCT/JP2019/031607.

(Continued)

*Primary Examiner* — Zakaria Elahmadi
(74) *Attorney, Agent, or Firm* — Wenderoth, Lind & Ponack, L.L.P.

(57) ABSTRACT

A vehicle drive device uses a parallel shaft gear reducer (30) in which a gear is composed of helical gear, as a speed reducer part (B) that decelerates and outputs a rotation of an electric motor part (A). In the vehicle drive device, of meshing parts of the gears formed in the speed reducer part (B), two gears form a meshing part in which the amount of misalignment that occurs between the tooth surfaces of the two gears meshing with each other is different during driving and during coasting of a vehicle. A first tooth surface (S1) meshing with a mating tooth surface during driving is subjected to tooth surface modification, and a second tooth surface (S2) meshing with a mating tooth surface during coasting is subjected to tooth surface modification of an amount different from an amount of the tooth surface modification to the first tooth surface (S1).

3 Claims, 8 Drawing Sheets

AFTER MODIFICATION

(56) References Cited

U.S. PATENT DOCUMENTS

| | | | | |
|---|---|---|---|---|
| 10,207,572 B2* | 2/2019 | Makino | ............... | B60K 7/0007 |
| 2008/0035407 A1 | 2/2008 | Murata et al. | | |
| 2008/0196530 A1 | 8/2008 | Shimada et al. | | |
| 2017/0335942 A1* | 11/2017 | Oh | ........................ | F16H 55/088 |
| 2018/0118023 A1 | 5/2018 | Makino et al. | | |
| 2020/0217410 A1* | 7/2020 | Yamaguchi | ............ | H02K 7/116 |

FOREIGN PATENT DOCUMENTS

| | | |
|---|---|---|
| JP | 2006-103487 | 4/2006 |
| JP | 2012-102753 | 5/2012 |
| JP | 2016-65617 | 4/2016 |
| JP | 2016-109289 | 6/2016 |
| JP | 2016-205452 | 12/2016 |
| JP | 2018-39396 | 3/2018 |
| JP | 2018-053927 | 4/2018 |
| WO | WO-2016171100 A1 * 10/2016 | ............... B60K 1/02 |

OTHER PUBLICATIONS

International Preliminary Report on Patentability and Written Opinion of the International Searching Authority dated Feb. 23, 2021 in International (PCT) Application No. PCT/JP2019/031607.
Extended European Search Report dated Mar. 23, 2022 in corresponding European Patent Application No. 19850595.0.
Notice of Dispatch of Duplicates of a Written Opposition issued Nov. 8, 2022 in corresponding Japanese Patent Application No. 2018-153548, with English translation.

* cited by examiner

DURING DRIVING

DURING COASTING

BEFORE MODIFICATION

AFTER MODIFICATION

DURING DRIVING

DURING COASTING

AFTER MODIFICATION

VEHICLE DRIVE DEVICE

TECHNICAL FIELD

The present invention relates to a vehicle drive device.

BACKGROUND ART

An in-wheel motor drive device, which is a type of vehicle drive device, is entirely housed inside a wheel or disposed near the wheel and thus a weight and size of the in-wheel motor drive device affect an unsprung weight (traveling performance) of a vehicle and a size of a cabin space. The in-wheel motor drive device therefore needs to be as light and compact as possible. However, the in-wheel motor drive device requires a large torque to drive the vehicle (wheels). Thus, in the in-wheel motor drive device, in general, a speed reducer part is provided between an electric motor part that generates a driving force and a wheel bearing part that rotatably supports the wheel, the speed reducer part decelerating a rotation of the electric motor part and outputting the rotation to a wheel bearing part (for example, Patent Literature 1). Patent Literature 1 employs a multi-stage reduction type parallel shaft gear reducer including an input gear shaft, an intermediate gear shaft, and an output gear shaft that are disposed in parallel to each other as the speed reducer part.

In Patent Literature 1, a helical gear of which tooth lead is formed in a spiral wire is used as an input gear, an intermediate gear, and an output gear that are provided on the input gear shaft, the intermediate gear shaft, and the output gear shaft, respectively. The helical gear is effective in achieving a speed reducer that is quiet and has a small torque fluctuation because the number of teeth that mesh with each other at the same time increases and tooth contact is dispersed. When a helical gear is used for each gear configuring the speed reducer, both a radial load and a thrust load act on each gear shaft due to the meshing of the gears. As bearings (rolling bearings) that support the gear shafts, bearings capable of receiving both the radial load and the thrust load, for example, deep groove ball bearings are used.

In a vehicle drive device using a parallel shaft gear reducer, misalignment may occur between the gear shafts (between tooth surfaces of two gears that mesh with each other) due to various factors such as a shape error and elastic deformation of the tooth surfaces of the gears, a machining error of the gear shafts, and a bearing gap and elastic deformation of the rolling bearings supporting the gear shafts. When such misalignment occurs, a meshing transmission error (a delay or advance of meshing, also referred to as "meshing error") occurs in a meshing part between the gears. The meshing transmission error, which has become larger, would adversely affect sound vibration performance and durability of the speed reducer and eventually riding comfort of the vehicle. It is therefore significantly important to reduce the meshing transmission error in the meshing part of the speed reducer in order to achieve a highly reliable vehicle drive device having excellent sound vibration performance and durability.

As a known technical means to reduce the meshing transmission error, the gears are subjected to the tooth surface modification. In gear mechanisms used in applications where the gears rotate in both forward and reverse directions, such as the parallel shaft gear reducer described in Patent Literature 1, both tooth surfaces of the gears are subjected to the tooth surface modification (for example, Patent Literature 2). In Patent Literature 2, a tooth lead of one of the two gears (pinion and output gear) that mesh with each other is subjected to crowning processing as tooth surface modification. This is to ensure that tooth leads of both the pinion and the output gear mesh with each other in parallel in accordance with inclination of the tooth lead of the pinion due to twisting deformation of the pinion.

CITATIONS LIST

Patent Literature

Patent Literature 1: JP 2018-53927 A
Patent Literature 2: JP 2006-103487 A

SUMMARY OF INVENTION

Technical Problems

Of the vehicle drive devices, in particular, in the in-wheel motor drive device disclosed in Patent Literature 1, it has been considered to devise an arrangement of the gear shafts, twisting angles of the teeth of the gears including helical gears, a size of the rolling bearings supporting the gear shafts (load capacity), and the like in order to further reduce the size and improve the durability. Thus, misalignment causing occurrence of a meshing transmission error will be three-dimensional, including a parallel error as a component parallel to the gear shafts and a skew error as a component perpendicular to the gear shafts. Thus, as described in Patent Literature 2, only by applying the tooth surface modification to the tooth lead of one of the two gears that mesh with each other, it is difficult to sufficiently reduce the meshing transmission error that occurs in the speed reducer of the vehicle drive device.

The present invention relates to a vehicle drive device using a parallel shaft gear reducer, in which each gear is composed of helical gears, as a speed reducer part which is configured to decelerate a rotation of an electric motor part and outputting the rotation, and a main object of the present invention is to make it possible to reduce the meshing transmission error of the speed reducer part, thereby improving the sound vibration performance and durability of the vehicle drive device.

Solutions to Problems

The present invention devised to achieve the above object is a vehicle drive device including an electric motor part configured to generate a driving force to drive a vehicle, and a speed reducer part having an input gear shaft, an intermediate gear shaft, and an output gear shaft that are disposed in parallel to each other, and configured to decelerate a rotation of the electric motor part input to the input gear shaft in two or more stages and output the rotation, in which a gear provided on each gear shaft is composed of a helical gear, of a plurality of meshing parts of the gears disposed in the speed reducer part, two gears include the meshing parts in which an amount of misalignment occurring between tooth surfaces of two gears meshing with each other differs during driving of the vehicle and during coasting of the vehicle, and a first tooth surface that meshes with a mating tooth surface during the driving is subjected to tooth surface modification, and a second tooth surface that meshes with a mating tooth surface during the coasting is subjected to tooth surface modification having a different amount of modification from the tooth surface modification applied to the first tooth surface. "During driving" in the present invention means that when the vehicle moves forward (when each gear shaft rotated in such a direction that moves the vehicle forward), and "during coasting" means when the vehicle moves rearward or coasts.

First, examples of the factors that cause misalignment between the tooth surfaces of two gears (helical gears) that mesh with each other include a shape error of the tooth surfaces, twisting directions of the teeth, and an amount of elastic deformation when a load acts on the tooth surfaces, a machining error of the gear shafts. What amount of misalignment occurs can be estimated with relatively high accuracy at a designing stage by, for example, performing finite element method analysis (FEM analysis) in consideration of the above various factors. Thus, the above configuration can achieve the gears in which the first tooth surface that meshes with the mating tooth surface during driving of the vehicle and the second tooth surface that meshes with the mating tooth surface during coasting of the vehicle are subjected to the tooth surface modification capable of effectively reducing the amount of misalignment that occurs between the tooth surfaces. It is therefore possible to reduce the meshing transmission error that occurs at each of the meshing parts of the gears formed in the speed reducer part. As a result, vibration and abnormal noise caused by the gears are suppressed in the speed reducer part (parallel shaft gear reducer) to achieve a highly reliable vehicle drive device with excellent sound vibration performance and durability.

In the above configuration, tooth profile crowning and tooth lead crowning can be selected as the tooth surface modification applied to both the first and second tooth surfaces. At this time, the amount of tooth surface modification (crowning amount) to the tooth surface (first tooth surface or second tooth surface) meshing with the mating tooth surface during driving or during coasting when a relatively larger amount of misalignment occurs is larger than the amount of tooth surface modification to the tooth surface (second tooth surface or first tooth surface) meshing with the mating tooth surface during driving or during coasting when a relatively smaller amount of misalignment occurs. A shape of the crowning is not limited, and for example, a shape represented by a straight line, a single arc, a combination of a plurality of arcs, a logarithmic function (logarithmic crowning), and the like can be appropriately selected.

The present invention can be preferably applied to a vehicle drive device having a configuration in which, for example, the gear shafts are rotatably supported by rolling bearings disposed at two positions apart from each other in an axial direction, and at least one of the gear shafts is rotatably supported by two rolling bearings having different load capacities (rigidity).

A twisting direction of teeth of a gear provided on the gear shaft rotatably supported by the two rolling bearings having different load capacities is preferably set such that a thrust load acts on the rolling bearing having a relatively larger load capacity during the driving. This makes it advantageous in reducing the amount of misalignment when the first tooth surfaces, which are more frequently used than the second tooth surface, mesh with each other. At this time, the amount of tooth surface modification to the second tooth surface is larger than the amount of tooth surface modification to the first tooth surface.

The present invention described above is applicable to a so-called on-board type vehicle drive device in which an electric motor part and a speed reducer part are attached to a vehicle body, and is also applicable to an in-wheel motor drive device or the like further including a wheel bearing part that rotatably supports wheels, in which output of the speed reducer part (rotation of the output gear shaft) is transmitted to a rotating end of the wheel bearing part.

Advantageous Effects of Invention

Accordingly, the present invention can reduce the meshing transmission error in the parallel shaft gear reducer and achieve a highly reliable vehicle drive device having excellent sound vibration performance and durability.

DESCRIPTION OF EMBODIMENTS

Hereinafter, embodiments of the present invention will be described with reference to the drawings.

Figure 8:
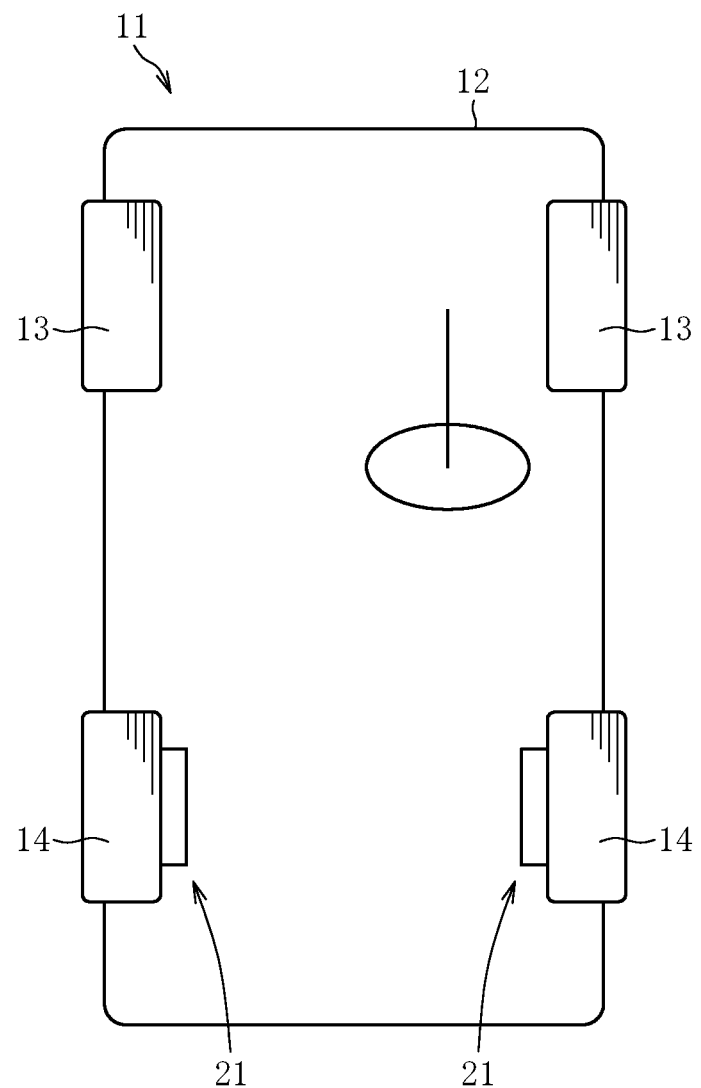
FIG. 8 is a schematic plan view of an electric vehicle equipped with the in-wheel motor drive device.
Figure 9:
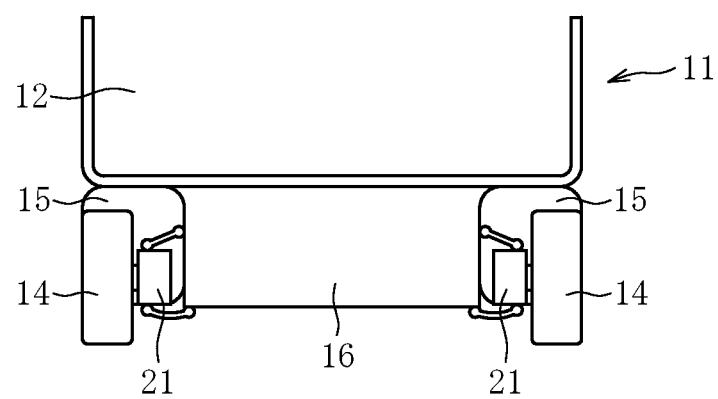
FIG. 9 is a rear sectional view of the electric vehicle shown in FIG. 8.

First, an outline of an electric vehicle 11 equipped with an in-wheel motor drive device, which is a kind of vehicle drive device, will be described with reference to FIGS. 8 and 9. As shown in FIG. 8, the electric vehicle 11 includes a chassis 12, a pair of front wheels 13 that functions as steering wheels, a pair of rear wheels 14 that functions as driving wheels, and in-wheel motor drive device 21 that drives each of the left and right rear wheels 14. As shown in FIG. 9, each of the rear wheels 14 is housed inside a wheel housing 15 of the chassis 12 and is fixed to below the chassis 12 via a suspension device 16.

The suspension device 16 supports each rear wheel 14 by a suspension arm extending to left and right, and absorbs vibrations received by each rear wheel 14 from a road surface by a strut including a coil spring and a shock absorber to suppress the vibrations of the chassis 12. The suspension device 16 is preferably an independent suspension type in which the left and right wheels are independently raised and lowered in order to improve followability to unevenness of the road surface and efficiently transmit a driving force of the rear wheels 14 to the road surface, but other suspension types may be adopted.

In this electric vehicle 11, the in-wheel motor drive device 21 that drives each of the left and right rear wheels 14 to rotate is incorporated inside the left and right wheel housings 15. This eliminates the need for providing a motor, a drive shaft, a differential gear mechanism, and the like on the chassis 12. Therefore, the electric vehicle 11 has an advantage that a large cabin space can be secured and rotations of the left and right rear wheels 14 can be each controlled.

The in-wheel motor drive device 21 can be applied not only to the rear-wheel drive type electric vehicle 11 having the rear wheels 14 as driving wheels as described above, but also to a front-wheel drive type electric vehicle having the front wheels 13 as driving wheels or a four-wheel drive type electric vehicle having both the front wheels 13 and the rear wheels 14 as driving wheels.

In order to improve traveling stability and noise, vibration and harshness (NVH) characteristics of the electric vehicle 11, an unsprung weight needs to be reduced. Further, in order to expand the cabin space of the electric vehicle 11, the in-wheel motor drive device 21 needs to be as compact as possible. Therefore, the in-wheel motor drive device 21 as described below is adopted.

Figure 1:
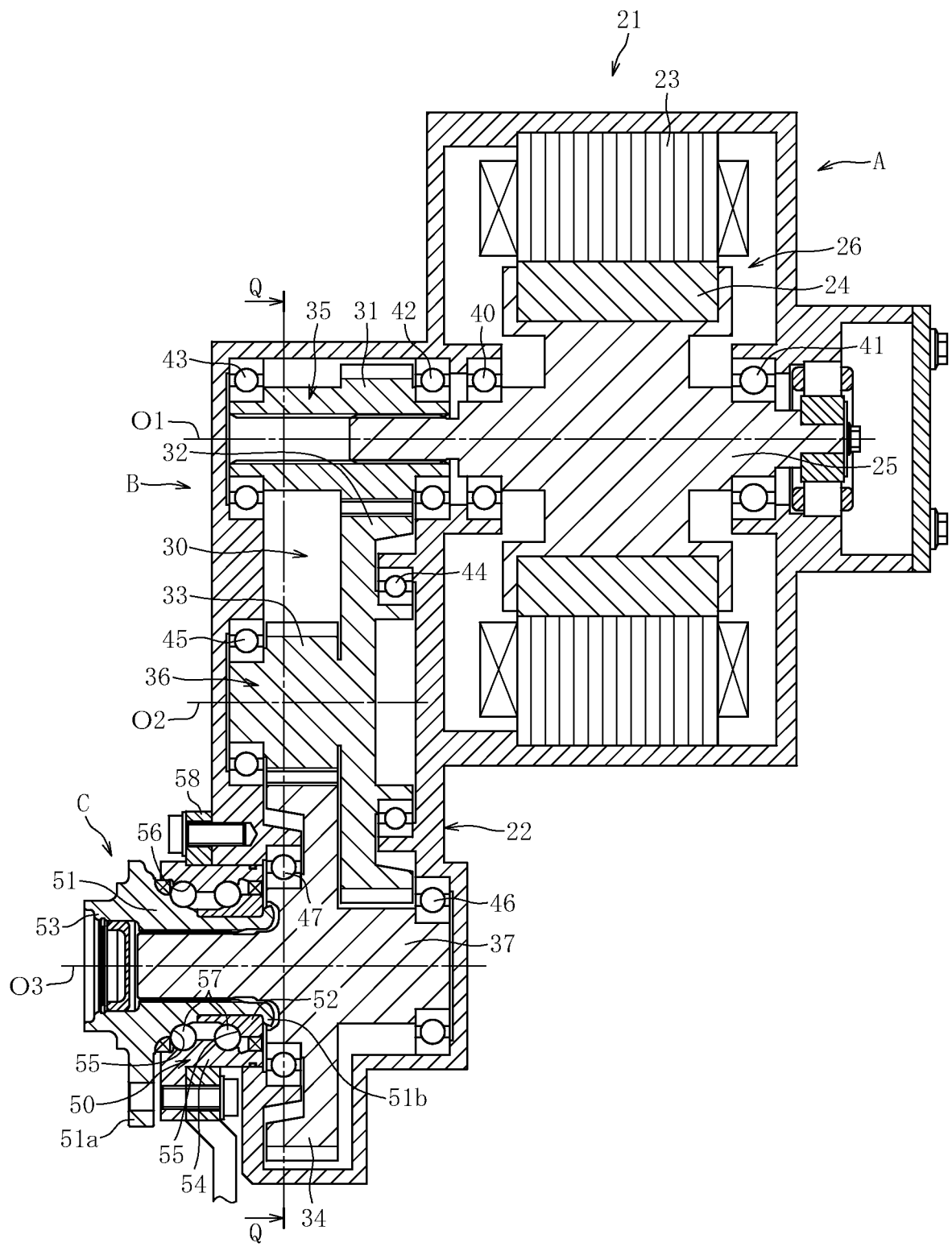
FIG. 1 is a sectional view showing a vehicle drive device (in-wheel motor drive device) according to one embodiment of the present invention, and is a sectional view taken along the line P-P in FIG. 2.

FIG. 1 is a sectional view of the in-wheel motor drive device 21 according to one embodiment of the present invention, specifically, the in-wheel motor drive device 21 that drives the left driving wheel of the electric vehicle 11 (see FIG. 8) to rotate. The in-wheel motor drive device 21 includes an electric motor part A that generates a driving force for driving the electric vehicle 11 (driving wheels), a speed reducer part B that decelerates and outputs rotation of the electric motor part A, and a wheel bearing part C that transmits the output of the speed reducer part B to the driving wheels. The electric motor part A and the speed reducer part B are housed in a casing 22, and the wheel bearing part C is attached to the casing 22. In the following description, outside in a vehicle width direction and inside in the vehicle width direction with the in-wheel motor drive device 21 attached inside the wheel housing 15 (see FIG. 9) are also referred to as an outboard side and an inboard side, respectively. In FIG. 1, a left side of the paper is the outboard side, and a right side of the paper is the inboard side.

The electric motor part A includes a radial gap type electric motor 26 including a tubular stator 23 fixed to the casing 22, a rotor 24 disposed on an inner circumference of the stator 23 via a radial clearance (not shown), and a motor rotating shaft 25 having the rotor 24 attached to an outer circumference of the motor rotating shaft 25. The motor rotating shaft 25 is rotatably supported with respect to the casing 22 by rolling bearings 40 and 41 disposed at two positions apart from each other in an axial direction, and is rotatable at a rotation speed of about 10,000 and several thousand times per minute. An axial gap type electric motor may be adopted for the electric motor part A instead of the radial gap type.

As shown in FIG. 1, the speed reducer part B includes an input gear shaft 35 having an input gear 31, an intermediate gear shaft 36 having an input-side intermediate gear (large-diameter gear) 32 and an output-side intermediate gear (small-diameter gear) 33, and an output gear shaft 37 having an output gear 34, and thus the speed reducer part B includes a so-called parallel shaft gear reducer 30 in which (central axes of) the gear shafts 35 to 37 are disposed in parallel to each other.

Figure 2:
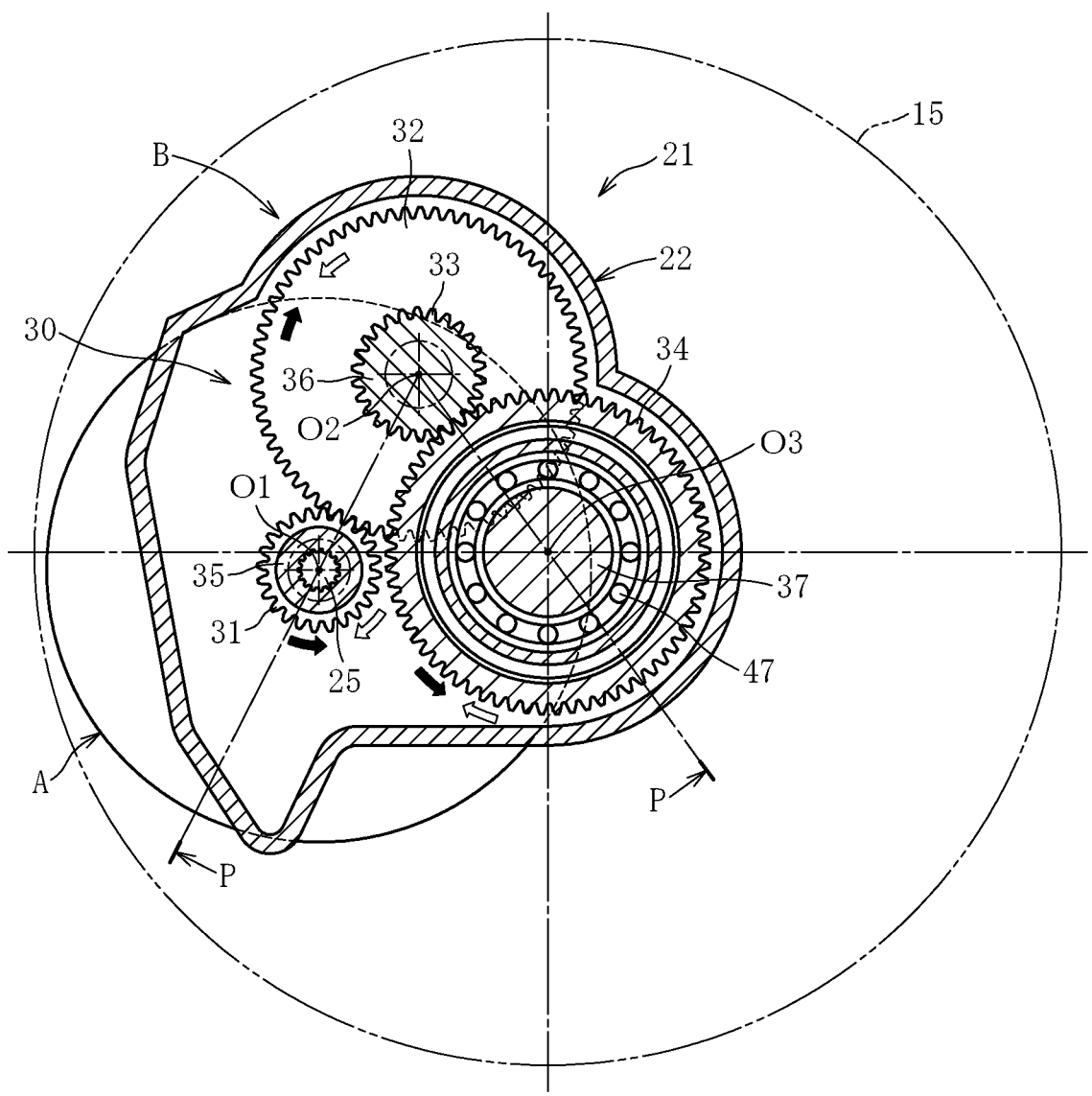
FIG. 2 is a sectional view taken along the line Q-Q in FIG. 1.

As shown in FIG. 2, the gear shafts 35 to 37 are disposed such that a locus formed by straight lines connecting rotation centers O1 to O3 of the gear shafts 35 to 37 forms a triangular shape. Specifically, the gear shafts 35 to 37 are disposed such that the straight line connecting the rotation center O1 of the input gear shaft 35 and the rotation center O3 of the output gear shaft 37 configures a base of the triangular locus, and the rotation center O2 of the intermediate gear shaft 36 configures an apex of the triangular locus. By arranging the gear shafts 35 to 37 as described above, the speed reducer part B can be compact in the radial direction. In FIG. 2, rotation directions of the gear shafts 35 to 37 when the electric vehicle 11 moves forward (during driving) are indicated by black arrows, and rotation directions of the gear shafts 35 to 37 when the electric vehicle 11 moves rearward are indicated by white arrows.

As shown in FIGS. 1 and 2, in the parallel shaft gear reducer 30, the input gear 31 and the input-side intermediate gear 32 mesh with each other, and the output-side intermediate gear 33 and the output gear 34 mesh with each other. The number of teeth of the input-side intermediate gear 32 is larger than the number of teeth of the input gear 31 and the number of teeth of the output-side intermediate gear 33, and the number of teeth of the output gear 34 is larger than the number of teeth of the output-side intermediate gear 33. In this configuration, the parallel shaft gear reducer 30 according to the present embodiment reduces the rotation speed of the motor rotating shaft 25 in two stages and outputs the rotation.

As shown in FIG. 1, the input gear shaft 35 is disposed coaxially with the motor rotating shaft 25, and is integrally rotatably connected to the motor rotating shaft 25 by spline fitting. Therefore, the rotation center of the motor rotating shaft 25 coincides with the rotation center O1 of the input gear shaft 35. The input gear shaft 35 is rotatably supported with respect to the casing 22 by rolling bearings 42 and 43 disposed at two positions apart from each other in the axial direction. The intermediate gear shaft 36 is rotatably supported with respect to the casing 22 by rolling bearings 44 and 45 disposed at two locations apart from each other in the axial direction. The output gear shaft 37 is rotatably supported with respect to the casing 22 by rolling bearings 46 and 47 disposed at two locations apart from each other in the axial direction.

As the rolling bearings 42 to 47 that support the gear shafts 35 to 37 described above, bearings capable of receiving both a radial load and a thrust load, for example, deep groove ball bearings are used. This is because helical gears are used as the gears 31 to 34 as will be described later, and both the radial load and the thrust load act on the gear shafts 35 to 37 via meshing parts of the gears.

As shown in FIG. 1, in the in-wheel motor drive device 21 according to the present embodiment, as the rolling bearing 44 that supports an end of the intermediate gear shaft 36 on the inboard side, a rolling bearing having a diameter larger than the rolling bearing 45 that supports an end of the intermediate gear shaft 36 on the outboard side, that is, a rolling bearing having a larger load capacity (higher rigidity) is used. As the rolling bearing 47 that supports the outboard side (near a central part in the axial direction) of the output gear shaft 37, a rolling bearing having a larger diameter than the rolling bearing 46 that supports an end of the output gear shaft 37 on the inboard side is used. In addition to this configuration, the input-side intermediate gear 32 is partially thinned and the rolling bearing 44 that supports the end of the intermediate gear shaft 36 on the inboard side is disposed on an inner circumference of the input-side intermediate gear 32, and the output gear 34 is partially thinned and the rolling bearing 47 that supports the outboard side of the output gear shaft 37 is disposed on an inner circumference of the output gear 34. By adopting the above configuration, the speed reducer part B (in-wheel motor drive device 21) is made compact while ensuring a high reduction ratio for the speed reducer part B.

Figure 3A:
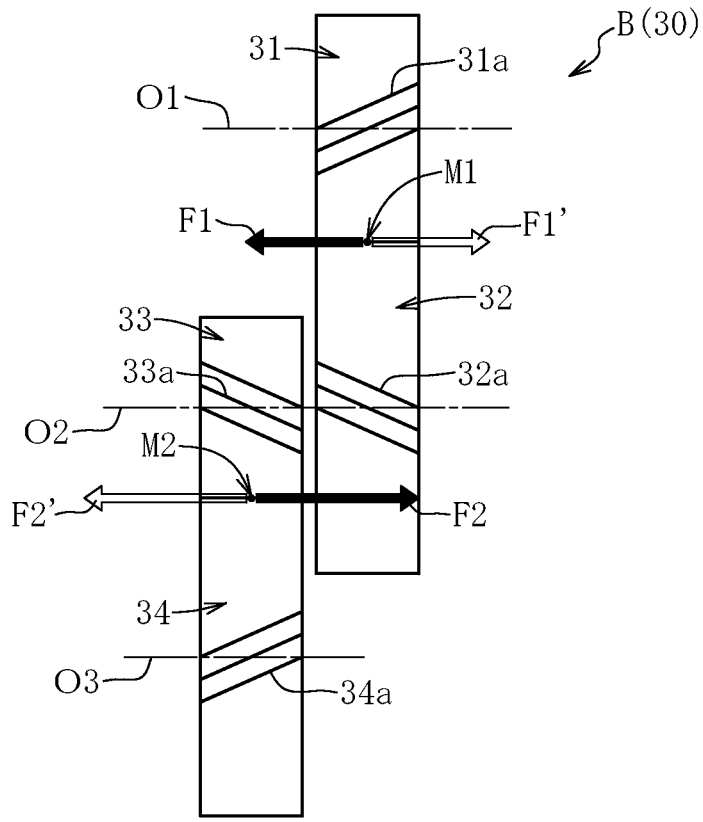
FIG. 3A is a diagram schematically showing a main part of a speed reducer shown in FIG. 1.

As schematically shown in FIG. 3A, as the input gear 31, the input-side intermediate gear 32, the output-side intermediate gear 33, and the output gear 34 provided in the speed reducer 30, helical gears are used in which tooth leads of the teeth 31a to 34a are each formed in a spiral wire (the tooth leads are inclined with respect to the axial direction). Helical gears have an advantage that the number of teeth meshed at the same time is large and tooth contact is dispersed, and noise of meshing is quiet and a torque fluctuation is small. Therefore, the use of helical gears is advantageous in achieving the speed reducer 30 that is quiet and has excellent torque transmission efficiency.

Because the gears 31 to 34 are configured by helical gears, both the radial load and the thrust load act on a meshing part M1 between the input gear 31 and the input-side intermediate gear 32 and a meshing part M2 between the output-side intermediate gear 33 and the output gear 34 while the in-wheel motor drive device 21 is being driven (while the gear shafts 35 to 37 are rotating). Therefore, while the in-wheel motor drive device 21 is being driven, the radial load and the thrust load are input to the input gear shaft 35 via the input gear 31 forming the meshing part M1, the radial load and the thrust load are input to the intermediate gear shaft 36 via the two intermediate gears 32 and 33 forming the meshing parts M1 and M2, and the radial load and the thrust load are input to the output gear shaft 37 via the output gear 34 forming the meshing part M2. These radial loads and thrust loads are supported by the rolling bearings 42 to 47 that support the gear shafts 35 to 37, respectively.

In the present embodiment, twisting directions of the teeth 31a to 34a of the gears 31 to 34 are set such that the thrust load input to the intermediate gear shaft 36 (a resultant force of the thrust load acting on the input-side intermediate gear 32 forming the meshing part M1 and the thrust load acting on the output-side intermediate gear 33 forming the meshing part M2) during driving of the electric vehicle 11 (when the gear shafts 35 to 37 rotate in the respective directions indicated by the black arrows in FIG. 2) acts on the rolling bearing 44 on the inboard side which has a relatively larger load capacity of the two rolling bearings 44 and 45 supporting the intermediate gear shaft 36, and the thrust load input to the output gear shaft 37 (the thrust load acting on the output gear 34 forming the meshing part M2) acts on the rolling bearing 47 on the outboard side which has a relatively larger load capacity, of the two rolling bearings 46 and 47 supporting the output gear shaft 37. Specifically, as shown in FIG. 3A, the twisting direction of the teeth 31a and 34a of the input gear 31 and the output gear 34 is a so-called left twist, and the twisting direction of the teeth 32a and 33a of the input-side intermediate gear 32 and the output-side intermediate gear 33 is a so-called right twist.

For reference, in FIG. 3A, directions of the thrust loads acting on the input-side intermediate gear 32 and the output-side intermediate gear 33 during driving of the electric vehicle 11 are indicated by black arrows F1 and F2, respectively, and directions of the thrust loads acting on the two intermediate gears 32 and 33 during coasting of the electric vehicle 11 are indicated by white arrows F1' and F2', respectively. In FIG. 3A, lengths of the arrows F1 and F2 are different from each other. This means that the thrust load acting on the output-side intermediate gear 33 is larger than the thrust load acting on the input-side intermediate gear 32 because the output-side intermediate gear 33 is located lower than the input-side intermediate gear 32 in a power transmission direction and transmits a large rotational torque. The same applies to the white arrows F1' and F2'. During driving, the thrust load as a reaction of the thrust load acting on the two intermediate gears 32 and 33 (thrust load in the directions indicated by the white arrows F1' and F2') acts on the input gear 31 and the output gear 34. Similarly, during coasting, the thrust load as a reaction of the thrust load acting on the two intermediate gears 32 and 33 (thrust load in the directions indicated by the black arrows F1 and F2) acts on the input gear 31 and the output gear 34.

As shown in FIG. 1, the wheel bearing part C is configured by a so-called inner ring rotation type wheel bearing 50. The wheel bearing 50 includes a double row angular ball bearing provided with an inner member 53 including a hub wheel 51 and an inner ring 52, an outer ring 54, a ball 57, and a cage (not shown). Although not shown in detail, an internal space of the wheel bearing 50 is filled with grease as a lubricant. Seal members are provided at both ends of the wheel bearing 50 in the axial direction in order to prevent foreign matter from entering the internal space of the bearing and prevent grease from leaking to the outside of the bearing.

The hub wheel 51 is rotatably connected to the output gear shaft 37 configuring the parallel shaft gear reducer 30 by spline fitting. A flange part 51a is provided on an outer circumference of an end of the hub wheel 51 on the outboard side, and the driving wheel is attached to the flange part 51a. Further, a crimping part 51b formed by crimping and fixing the inner ring 52 is formed at an end of the hub wheel 51 on the inboard side. The crimping part 51b has a function of applying a preload to the wheel bearing 50.

An inner raceway surface 55 on the outboard side is formed on an outer circumference of the hub wheel 51, and an inner raceway surface 55 on the inboard side is formed on an outer circumference of the inner ring 52. A double row outer raceway surface 56 corresponding to both inner raceway surfaces 55 and 55 is formed on an inner circumference of the outer ring 54, and a plurality of balls 57 is built in a ball track formed by the paired inner raceway surface 55 and the outer raceway surface 56. The outer ring 54 has a flange part extending radially outward from an end of the outer ring 54 on the outboard side, and is bolted to the casing 22 via an attachment 58 bolted to the flange part.

An overall operation mode of the in-wheel motor drive device 21 having the above configuration will be briefly described. First, in the electric motor part A, when an alternating current is supplied to the stator 23, the rotor 24 and the motor rotating shaft 25 rotate integrally due to an electromagnetic force generated by the alternating current. The rotation of the motor rotating shaft 25 is decelerated by the parallel shaft gear reducer 30 in the speed reducer part B and then transmitted to the wheel bearing 50. Thus, when the electric motor 26 of a low torque and high rotation type (small electric motor) is adopted, a required torque can be transmitted to the driving wheel.

Although not shown, the in-wheel motor drive device 21 has a lubrication mechanism that supplies lubricating oil to each part of the electric motor 26 and the parallel shaft gear reducer 30. While the in-wheel motor drive device 21 is being driven, each part of the electric motor 26 is cooled and each part of the parallel shaft gear reducer 30 is lubricated and cooled by the lubricating oil supplied from the lubrication mechanism.

A basic configuration of the in-wheel motor drive device 21 according to the present embodiment has been described above, and the main feature of the in-wheel motor drive device 21 according to the present embodiment is to be able to suppress occurrence of a meshing transmission error caused by misalignment that occurs between the tooth surfaces of two gears meshing with each other. Hereinafter, a main reason why misalignment occurs between the tooth surfaces of two gears meshing with each other will be described first, and then a characteristic configuration adopted in the present invention will be described.

First, as described above, in order to make the in-wheel motor drive device 21 compact, of the two rolling bearings 44 and 45 that support the intermediate gear shaft 36, a rolling bearing having a larger diameter and a larger load capacity (higher rigidity) than the rolling bearing 45 on the outboard side is used as the rolling bearing 44 on the inboard side, and of the two rolling bearings 46 and 47 that support the output gear shaft 37, a rolling bearing having a larger diameter and a higher rigidity than the rolling bearing 46 on the inboard side is used as the rolling bearing 47 on the outboard side.

Further, in order to achieve the parallel shaft gear reducer 30 which is quiet and has excellent torque transmission efficiency, helical gears are used as the gears 31 to 34 provided on the gear shafts 35 to 37. In this way, the helical gears are used as the gears 31 to 34 configuring the speed reducer 30, the thrust load generated in the meshing parts M1 and M2 (see FIG. 3A) of the gears acts on the gear shafts 35 to 37 while the in-wheel motor drive device 21 is being driven. This thrust load will be supported by rolling bearings 42 to 47 that support the gear shafts 35 to 37. A frequency with which the electric vehicle 11 moves forward is significantly higher than a frequency with which the electric vehicle 11 moves rearward or coasts.

Therefore, in the present embodiment, as described with reference to FIG. 3A, the twisting directions of the teeth 31a to 34a of the gears 31 to 34 are set such that the thrust load input to the intermediate gear shaft 36 during driving of the electric vehicle 11 (the resultant force of the thrust loads acting on the two intermediate gears 32 and 33) acts on the rolling bearing 44 on the inboard side having a relatively larger load capacity, of the two rolling bearings 44 and 45 that support the intermediate gear shaft 36 during driving of the electric vehicle 11, and such that the thrust load input to the output gear shaft 37 acts on the rolling bearing 47 on the outboard side having a relatively larger load capacity of the two rolling bearings 46 and 47 that support the output gear shaft 37.

Figure 3B:
FIG. 3B is a diagram for explaining inclination of an intermediate gear shaft during driving and during coasting in a configuration shown in FIG. 3A.
Figure 3B:
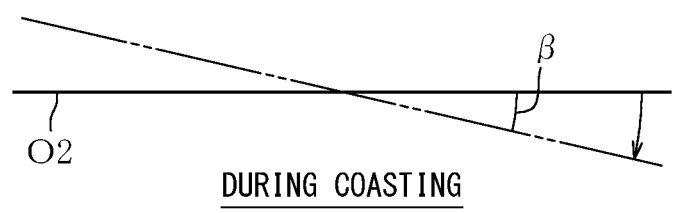

During driving of the in-wheel motor drive device 21, in addition to the thrust load acting on the input-side intermediate gear 32 and the output-side intermediate gear 33, a moment load due to this thrust load also acts on the intermediate gear shaft 36. When a moment load acts on the intermediate gear shaft 36, the intermediate gear shaft 36 inclines in the axial direction (with respect to a straight line extending in the axial direction through the rotation center O2). During driving of the electric vehicle 11, the thrust loads indicated by the black arrows F1 and F2 in FIG. 3A act on the input-side intermediate gear 32 and output-side intermediate gears 33. Thus, as shown in FIG. 3B, a moment load acts so as to rotate the intermediate gear shaft 36 (a straight line of the intermediate gear shaft 36 extending along the rotation center O2) in a counterclockwise direction. Meanwhile, during coasting of the electric vehicle 11, the thrust load indicated by the white arrows F1' and F2' in FIG. 3A acts on the input-side intermediate gear 32 and the output-side intermediate gear and 33. Thus, as shown in FIG. 3B, a moment load acts so as to incline the intermediate gear shaft 36 (a straight line of the intermediate gear shaft 36 extending along the rotation center O2) in a clockwise direction. However, as described above, the two rolling bearings 44 and 45 that support the intermediate gear shaft 36 have a higher rigidity than the rolling bearing 44 on the inboard side, and therefore, an absolute value of an amount of inclination of the intermediate gear shaft 36 generated as the moment load acts on the intermediate gear shaft 36 is larger during coasting than during driving ($\alpha<\beta$) as shown in FIG. 3B.

Further, while the in-wheel motor drive device 21 is being driven, a moment load due to the thrust load acting on the output gear 34 also acts on the output gear shaft 37. Of the two rolling bearings 46 and 47 that support the output gear shaft 37, the rolling bearing 47 on the outboard side has a higher rigidity, and therefore, an amount of inclination of the output gear shaft 37 generated as the moment load acts on the output gear shaft 37 is larger during coasting than during driving, similarly to the intermediate gear shaft 36 described with reference to FIG. 3B.

While the in-wheel motor drive device 21 is being driven, a moment load due to the thrust load acting on the input gear 31 also acts on the input gear shaft 35, but the thrust load acting on the input gear 31 is significantly smaller than the thrust load acting on the output gear 34. Further, unlike the intermediate gear shaft 36, the thrust load does not act on the input gear shaft 35 from the two gears (the input-side intermediate gear 32 and the output-side intermediate gear 33). Therefore, the amount of inclination of the input gear shaft 35 generated as the moment load acts is smaller than the amount of inclination of the intermediate gear shaft 36 and the output gear shaft 37.

Consequently, during driving of the in-wheel motor drive device 21 according to the present embodiment, because of the inclination of the intermediate gear shaft 36 and the output gear shaft 37, misalignment is likely to occur between the tooth surfaces of the input gear 31 and the input-side intermediate gear 32 that mesh with each other and between the tooth surfaces of the output-side intermediate gear 33 and the output gear 33 that mesh with each other, and an amount of misalignment is larger during coasting than during driving.

Further, while the in-wheel motor drive device 21 is being driven, the gears 31 to 34 are elastically deformed by the radial load and the thrust load acting on the meshing part M1 between the input gear 31 and the input-side intermediate gear 32 and the meshing part M2 between the output-side intermediate gear 33 and the output gear 34. In the in-wheel motor drive device 21 according to the present embodiment, as shown in FIG. 1, the input-side intermediate gear 32 and the output gear 34 are formed in an asymmetric shape in a tooth width direction, and therefore amounts of elastic deformation of the input-side intermediate gear 32 and the output gear 34 are different depending on the direction in which the thrust load acts. Therefore, in terms of this point as well, the misalignment is likely to occur between the tooth surfaces of the input gear 31 and the input-side intermediate gear 32 that mesh with each other and between the tooth surfaces of the output-side intermediate gear 33 and the output gear 33 that mesh with each other, and the amounts of misalignment during driving and during coasting are different.

Figure 4:
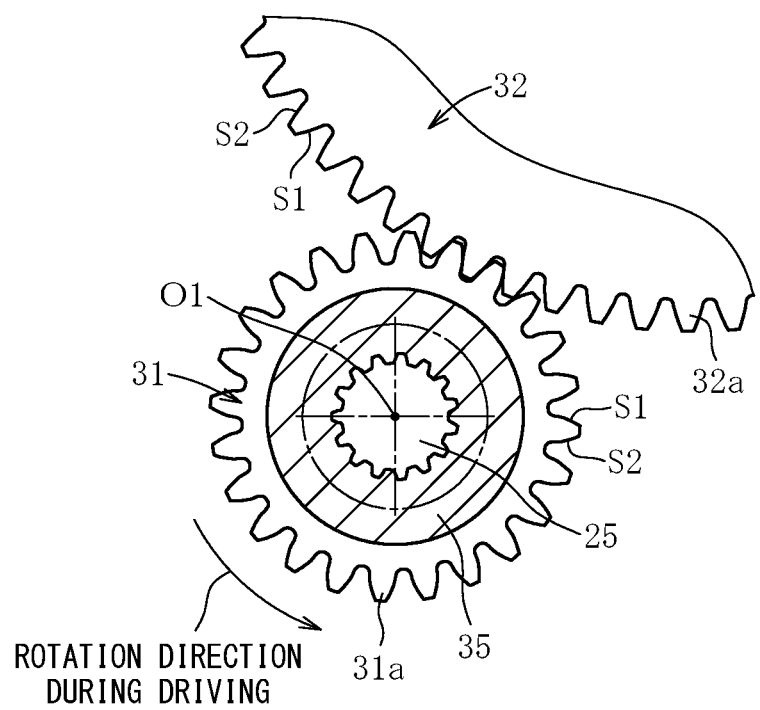
FIG. 4 is a partially enlarged view of FIG. 2.

Therefore, in the present invention, of a plurality of meshing parts of the gears that is formed in the speed reducer 30, two gears form the meshing part in which the amount of misalignment that occurs between the tooth surfaces of the two gears meshing with each other is different during driving and during coasting of the electric vehicle 11. The first tooth surface meshing with a mating tooth surface during driving is subjected to the tooth surface modification, and the second tooth surface meshing with a mating tooth surface during coasting is subjected to the tooth surface modification of an amount different from an amount of the tooth surface modification for the first tooth surface. In the in-wheel motor drive device 21 according to the present embodiment, as described above, the amount of misalignment that occurs between the tooth surfaces of the input gear 31 and the tooth surface of the input-side intermediate gear 32 that form the meshing part M1 and the amount of misalignment that occurs between the tooth surfaces of the output-side intermediate gear 33 and the output gear 34 that form the meshing part M2 are both different during driving and during coasting. Therefore, a first tooth surface S1 and a second tooth surface S2 (see FIG. 4) of the teeth 31a and 32a of the input gear 31 and the input-side intermediate gear 32, and the first and second tooth surfaces (not shown) of the teeth 33a and 34a of the output-side intermediate gear 33 and the output gear 34 are modified surfaces subjected to the tooth surface modification that satisfies the above conditions.

Hereinafter, a specific example of tooth surface modification will be described with reference to FIGS. 5A, 5B, and 5C, taking the tooth 32a of the input-side intermediate gear 32 as a representative example among the gears 31 to 34.

Figure 5A:
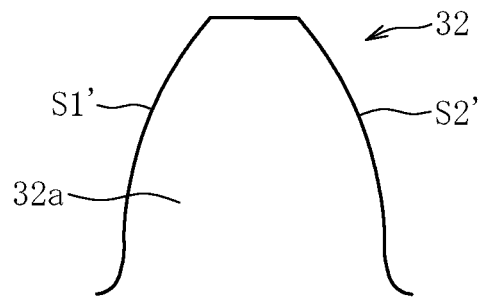
FIG. 5A is a partially enlarged front view of a gear before a tooth surface modification.

First, as shown in FIG. 5A, the tooth 32a before the tooth surface modification has a so-called involute-shaped tooth profile. That is, a first tooth surface S1' and a second tooth surface S2' of the tooth 32a before the tooth surface modification are both formed by an involute curve. As described above, in the in-wheel motor drive device 21 according to the present embodiment, the amount of misalignment between the tooth surfaces of the input gear 31 and the input-side intermediate gear 32 that mesh with each other is larger during coasting than during driving. Thus, the amount of tooth surface modification for the second tooth surface S2' is larger than the amount of tooth surface modification for the first tooth surface S1'.

Figure 5B:
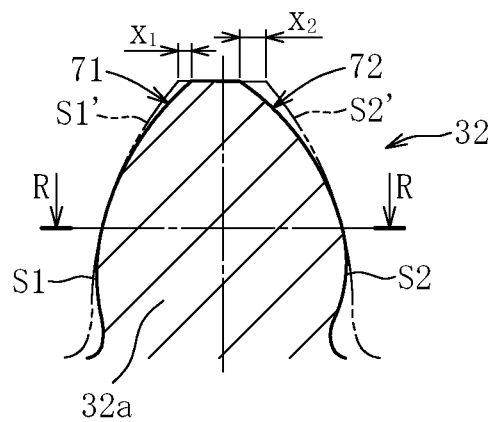
FIG. 5B is a partially enlarged front view of the gear after the tooth surface modification when the configuration shown in FIG. 3A is adopted, and is a sectional view taken along the line T-T in FIG. 5C.
Figure 5C:
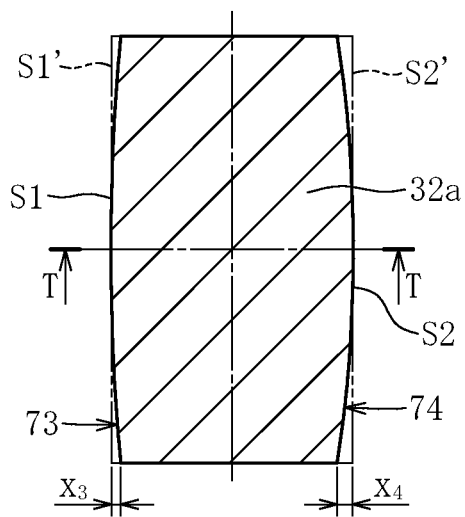
FIG. 5C is a sectional view taken along the line R-R in FIG. 5B.

Specifically, as shown in FIG. 5B, the first tooth surface S1' and the second tooth surface S2' are provided with tooth profile crownings 71 and 72, respectively, as the tooth surface modification, and a crowning amount (thinning amount) $x_2$ (i.e., a profile crowning amount P1) of the tooth profile crowning 72 is larger than a crowning amount $x_1$ (i.e., a profile crowning amount P2) of the tooth profile crowning 71 ($x_2 > x_1$) (i.e., P1>P2). Further, as shown in FIG. 5C, the first tooth surface S1' and the second tooth surface S2' are provided with tooth lead crownings 73 and 74, respectively, as the tooth surface modification, and a crowning amount $x_4$ (i.e., a lead crowning amount Q1) of the tooth lead crowning 74 is larger than a crowning amount $x_3$ (i.e., a lead crowning amount Q2) of the tooth lead crowning 73 ($x_4 > x_3$) (i.e., Q1>Q2). A magnitude relation of the crowning amount $x_1$ and $x_2$ here is a magnitude relation in the same radial position, and a magnitude relation of the crowning amount $x_3$ and $x_4$ is a magnitude relation in the same axial position (position in a tooth lead direction). Further, shapes of the crownings 71 to 74 are not limited, and the shapes of the crownings 71 to 74 that are particularly effective in reducing the amount of misalignment in the meshing part M1 are selected.

The input-side intermediate gear 32 provided with crownings 71 to 74 on each tooth 32a is obtained, for example, by heating a gear material formed on a so-called involute gear by cutting to obtain the heated gear material, and then by grinding the teeth of the heated gear material. In this case, of the first tooth surface S1 and the second tooth surface S2 of the tooth 32a, parts provided with the crownings 71 to 74 are ground surfaces.

Examples of causes of misalignment between the tooth surfaces of the two gears (helical gears) that mesh with each other include the twisting directions of the teeth 31a to 34a described above (the directions of the thrust loads acting on the gears 31 to 34), the amount of elastic deformation when a load acts on the tooth surfaces, specifications of the rolling bearings 42 to 47 that support the gear shafts 35 to 37, a shape error of the tooth surfaces, and a machining error of the gear shafts 35 to 37. What amount of misalignment occurs, or conversely, how much tooth surface modification to be applied is effective to reduce the amount of misalignment that occurs between the tooth surfaces of the two gears meshing with each other can be estimated with relatively high accuracy at a designing stage of the in-wheel motor drive device 21 by performing FEM analysis in consideration of the above various factors.

Thus, adopting the above configuration of the present invention can achieve the gears 31 to 34 in which the first tooth surface S1 that meshes with the mating tooth surface during driving of the electric vehicle 11 and the second tooth surface S2 that meshes with the mating tooth surface during coasting of the electric vehicle 11 are both subjected to the tooth surface modification capable of effectively reducing the amount of misalignment that occurs between the tooth surfaces. This can reduce the meshing transmission error that occurs in each of the meshing parts M1 and M2 of the gears formed in the speed reducer part B (parallel shaft gear reducer 30), and suppress vibration and abnormal noise caused by the gears in the parallel shaft gear reducer 30. Therefore, the present invention can achieve the highly reliable in-wheel motor drive device 21 having excellent sound vibration performance and durability.

Although the in-wheel motor drive device 21 according to one embodiment of the present invention have been described above, the in-wheel motor drive device 21 can be appropriately modified without departing from the gist of the present invention.

Figure 6A:
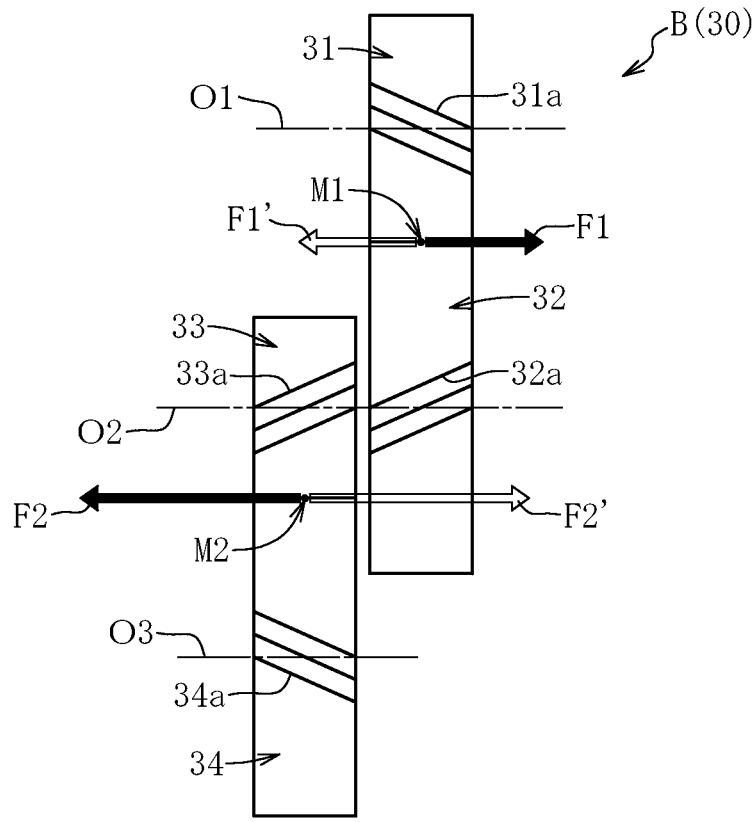
FIG. 6A is a diagram schematically showing a main part of a speed reducer according to a second embodiment.

For example, as shown in FIG. 6A, the twisting directions of the teeth 31a to 34a of the gears 31 to 34 may be opposite to those of the first embodiment shown in FIG. 3A. In this case, the thrust load input to the intermediate gear shaft 36 during driving of the electric vehicle 11 (the resultant force of the thrust loads acting on the two intermediate gears 32 and 33) acts on the rolling bearing 45 on the outboard side having a relatively small load capacity of the two rolling bearings 44 and 45 that support the intermediate gear shaft 36, and such that the thrust load input to the output gear shaft 37 during driving of the electric vehicle 11 acts on the rolling bearing 46 on the inboard side having a relatively small load capacity, of the two rolling bearings 46 and 47 that support the output gear shaft 37.

Figure 6B:
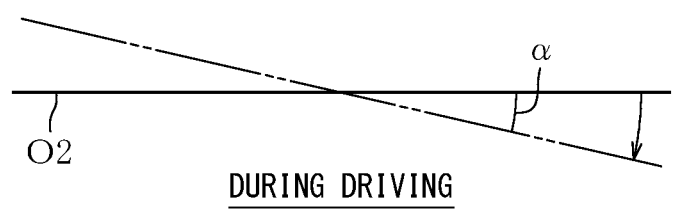
FIG. 6B is a diagram for explaining inclination of the intermediate gear shaft during driving and during coasting in a configuration shown in FIG. 6A.
Figure 6B:
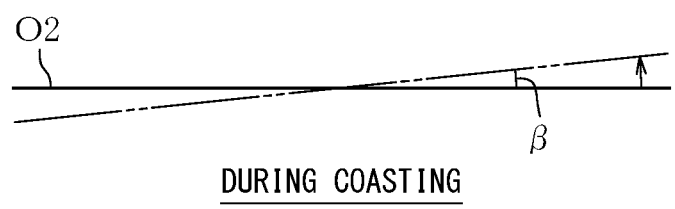

In this case, a direction and magnitude of the moment load acting on the intermediate gear shaft 36 as the in-wheel motor drive device 21 is driven are opposite to those shown in FIG. 3B. Therefore, as shown in FIG. 6B, the absolute value of the amount of inclination of the intermediate gear shaft 36 generated by the moment load acting on the intermediate gear shaft 36 is larger during driving than during coasting ($\alpha > \beta$). Although not shown in detail, the same applies to the output gear shaft 37. In short, in this case, due to the inclination of the intermediate gear shaft 36 and the output gear shaft 37, the amount of misalignment that occurs between the tooth surfaces of the input gear 31 and the input-side intermediate gear 32 meshing with each other and the amount of misalignment that occurs between the tooth surfaces of the output-side intermediate gear 33 and the output gear 33 meshing with each other are larger during driving than during coasting.

Figure 7A:
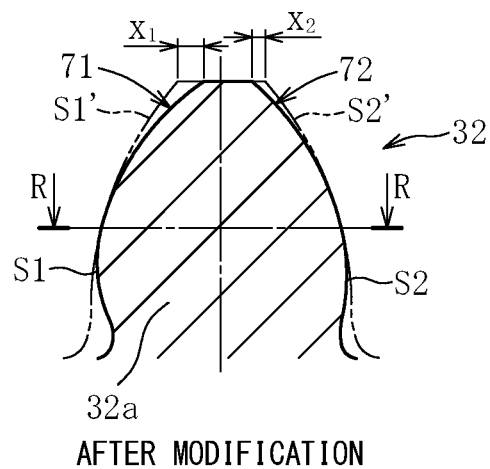
FIG. 7A is a partially enlarged front view of the gear after the tooth surface modification when the configuration shown in FIG. 6A is adopted, and is a sectional view taken along the line T-T in FIG. 7B.
Figure 7B:
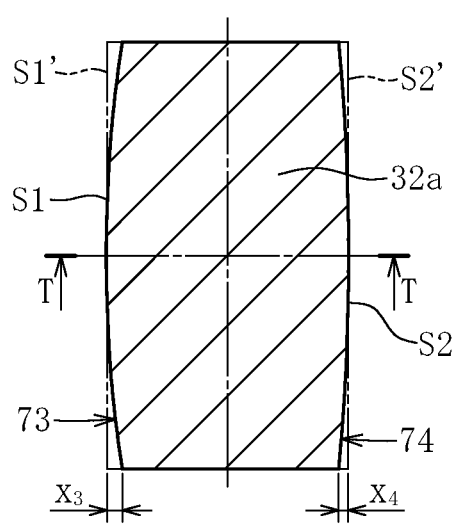
FIG. 7B is a sectional view taken along the line R-R in FIG. 7A.

Thus, in the present embodiment, as shown in FIGS. 7A and 7B, the amount of tooth surface modification to the first tooth surface S1' is larger than the amount of tooth surface modification to the second tooth surface S2'. Specifically, as shown in FIG. 7A, the first tooth surface S1' and the second tooth surface S2' are provided with tooth profile crownings 71 and 72, respectively, as the tooth surface modification, and a crowning amount (thinning amount) $x_1$ (i.e., a profile crowning amount P1) of the tooth profile crowning 71 is larger than a crowning amount $x_2$ (i.e., a profile crowning amount P2) of the tooth profile crowning 72 ($x_1 > x_2$) (i.e., P1>P2). Further, as shown in FIG. 7B, the first tooth surface S1' and the second tooth surface S2' are provided with tooth lead crownings 73 and 74, respectively, as the tooth surface modification, and a crowning amount $x_3$ (i.e., a lead crowning amount Q1) of the tooth lead crowning 73 is larger than a crowning amount $x_4$ (i.e., a lead crowning amount Q2) of the tooth lead crowning 74 ($x_3 > x_4$) (i.e., Q1>Q2). As a result, the same effect as that of the first embodiment can be obtained.

In the above embodiment, of the two intermediate gears 32 and 33, the speed reducer 30 is adopted in which the input-side intermediate gear 32 is disposed on the inboard side and the output-side intermediate gear 33 is disposed on the outboard side. However, on the contrary, the present invention is also applicable to a case where the speed reducer 30 (not shown) is adopted in which the input-side intermediate gear 32 is disposed on the outboard side and the output-side intermediate gear 33 is disposed on the inboard side.

Further, in the above embodiment, the parallel shaft gear reducer 30 (three-shaft parallel shaft gear reducer 30) is adopted in which a single intermediate gear shaft 36 is disposed between the input gear shaft 35 and the output gear shaft 37, and the rotation of the motor rotating shaft 25 is reduced in two stages and transmitted to the wheel bearing part C. However, in the speed reducer part B, the parallel shaft gear reducer 30 having four or more shafts can be adopted in which two or more intermediate gear shafts 36 are disposed between the input gear shaft 35 and the output gear shaft 37 (not shown).

Further, in the above, the present invention is applied to the in-wheel motor drive device 21 including the electric motor part A and the speed reducer part B housed in the casing 22 and the wheel bearing part C attached to the casing 22. However, the present invention is also applicable to a vehicle drive device other than the in-wheel motor drive device 21, for example, a so-called on-board type vehicle drive device in which a casing housing the electric motor part A and the speed reducer part B is attached to a vehicle body, and the output of the speed reducer part B is transmitted to the driving wheels (wheel bearings) via the drive shaft.

The present invention is not limited to the above embodiments at all, and may be implemented in various other forms without departing from the gist of the present invention. That is, the scope of the present invention is defined by the claims, and further includes equivalent meanings described in the claims, and all modifications within the claims.

REFERENCE SIGNS LIST

11 Electric vehicle (vehicle)
15 Wheel housing
21 In-wheel motor drive device
26 Electric motor
30 Speed reducer (parallel shaft gear reducer)
31 Input gear
32 Input-side intermediate gear (large-diameter gear)
33 Output-side intermediate gear (small-diameter gear)
34 Output gear
35 Input gear shaft
36 Intermediate gear shaft
37 Output gear shaft
50 Wheel bearing
71 Tooth profile crowning
72 Tooth profile crowning
73 Tooth lead crowning
74 Tooth lead crowning
A Electric motor part
B Speed reducer part
C Wheel bearing part
M1, M2 Meshing part
S1 First tooth surface
S2 Second tooth surface

The invention claimed is:

1. A vehicle drive device comprising:
an electric motor part configured to generate a driving force to drive a vehicle; and
a speed reducer part having an input gear shaft, an intermediate gear shaft, and an output gear shaft that are disposed in parallel to each other, and configured to decelerate a rotation of the electric motor part input to the input gear shaft in two or more stages and output the rotation,
a gear provided on each of the input gear shaft, the intermediate gear shaft, and the output gear shaft is a helical gear,
wherein
of a plurality of meshing parts of the gears disposed in the speed reducer part, two gears include the meshing parts in which an amount of misalignment occurring between tooth surfaces of two gears meshing with each other differs during driving of the vehicle and during coasting of the vehicle,
a first tooth surface that meshes with a mating tooth surface during the driving is subjected to tooth surface modification, and a second tooth surface that meshes with a mating tooth surface during the coasting is subjected to tooth surface modification having a different amount of modification from the tooth surface modification applied to the first tooth surface,
both the first tooth surface and the second tooth surface are subjected to tooth profile crowning as the tooth surface modification,
when a profile crowning amount of the tooth profile crowning to the tooth surface meshing with the mating tooth surface during the driving or during the coasting when a relatively larger amount of misalignment occurs is P1 and a profile crowning amount of the tooth profile crowning to the tooth surface meshing with the mating tooth surface during the driving or during the coasting when a relatively smaller amount of misalignment occurs is P2, a magnitude relationship between P1 and P2 in a same radial position is P1>P2, both the first tooth surface and the second tooth surface are also subjected to tooth lead crowning as the tooth surface modification, and when a lead crowning amount of the tooth lead crowning to the tooth surface meshing with the mating tooth surface during the driving or during the coasting when a relatively larger amount of misalignment occurs is Q1 and a lead crowning amount of the tooth lead crowning to the tooth surface meshing with the mating tooth surface during the driving or during the coasting when a relatively smaller amount of misalignment occurs is Q2, a magnitude relationship between Q1 and Q2 in a same axial position is Q1>Q2.

2. The vehicle drive device according to claim 1, wherein the input gear shaft, the intermediate gear shaft, and the output gear shaft are each rotatably supported by rolling bearings disposed at two positions apart from each other in an axial direction, and at least one of the input gear shaft, the intermediate gear shaft, and the output gear shaft is rotatably supported by two rolling bearings having different load capacities.

3. The vehicle drive device according to claim 2, wherein a twisting direction of teeth of a gear provided on the gear shaft rotatably supported by the two rolling bearings having different load capacities is set such that a thrust load acts on the rolling bearing having a relatively larger load capacity during the driving.

* * * * *